US007094454B2

(12) United States Patent
Kuo et al.

(10) Patent No.: US 7,094,454 B2
(45) Date of Patent: Aug. 22, 2006

(54) MULTI-COLOR MULTI-PLY NOTE PAD

(75) Inventors: Tsung-Tien Kuo, Kaohsiung Hsien (TW); Jen-Rong Liu, Feng-Shan (TW); Chin-Chung Tsai, Pan-Chiao (TW); Hsieh-Chang Hsieh, Feng-Shan (TW)

(73) Assignee: Taiwan Hopax Chems. Mfg. Co., Ltd., Kaohsiung Hsien (TW)

( * ) Notice: Subject to any disclaimer, the term of this patent is extended or adjusted under 35 U.S.C. 154(b) by 75 days.

(21) Appl. No.: 10/763,684

(22) Filed: Jan. 23, 2004

(65) Prior Publication Data

US 2005/0163957 A1 Jul. 28, 2005

(51) Int. Cl.
*B32B 9/00* (2006.01)

(52) U.S. Cl. .................. 428/40.1; 283/63.1; 428/41.6; 428/41.9; 428/42.1; 428/42.2; 428/42.3; 428/43; 428/192; 428/194; 462/72; 462/901

(58) Field of Classification Search .............. 428/40.1, 428/41.6, 41.9, 42.1, 42.2, 42.3, 43, 192, 428/194; 283/63.1; 462/72, 901
See application file for complete search history.

(56) References Cited

U.S. PATENT DOCUMENTS

| | | | | |
|---|---|---|---|---|
| 3,334,921 | A * | 8/1967 | Fischer | 462/17 |
| 4,934,740 | A * | 6/1990 | Drake | 462/17 |
| 5,376,205 | A * | 12/1994 | Drake | 156/240 |

* cited by examiner

*Primary Examiner*—Nasser Ahmad
(74) *Attorney, Agent, or Firm*—Frommer Lawrence & Haug LLP; Ronald R. Santucci

(57) ABSTRACT

A multi-color multi-ply note pad includes a plurality of note sheets, each of which has a perforated tear line that divides the note sheet into a stub portion and an inscribing portion, a binding member that binds the stub portions of the note sheets in a stack, and a repositionable adhesive layer provided on each of the note sheets at the inscribing portion of each of the note sheets and disposed adjacent to the tear line. The stub portions of the note sheets remain intact in the stack through the binding member when the inscribing portions of middle ones of the note sheets are removed from the stack.

6 Claims, 3 Drawing Sheets

MULTI-COLOR MULTI-PLY NOTE PAD

BACKGROUND OF THE INVENTION

1. Field of the Invention

This invention relates to a note pad, more particularly to a multi-color multi-ply note pad having stacked repositionable note sheets that are divided into a plurality of plies which differ from each other in color.

2. Description of the Related Art

FIG. 1 illustrates a conventional note pad 1 that includes a plurality of colored note sheets 11 and an adhesive film 12 coated on one side of each of the note sheets 11 for securing the note sheets 11 in a stack and for permitting removal of the note sheets 11 from the stack. The note sheets 11 are divided into a plurality of plies, which differ from each other in color. Since the side of each note sheet 11 is bonded to a portion of the adhesive film 12, removal of middle ones of the note sheets 11 from the stack will weaken parts of the adhesive film 12 corresponding to the removed middle note sheets 11, which, in turn, can result in separation of the note pad 1 into a number of parts or deformation of the adhesive film 12 (see FIG. 2).

SUMMARY OF THE INVENTION

Therefore, the object of the present invention is to provide a note pad that is capable of overcoming the aforementioned drawbacks of the prior art.

According to the present invention, there is provided a note pad that comprises: a plurality of note sheets stacked one above the other, each of the note sheets having a bottom surface and a perforated tear line that divides the note sheet into a stub portion and an inscribing portion so as to facilitate removal of the inscribing portion from the stub portion; a binding member that binds the stub portions of the note sheets in a stack; and a repositionable adhesive layer provided on the bottom surface of each of the note sheets at the inscribing portion of each of the note sheets and disposed adjacent to the tear line so as to permit adherence of the inscribing portion to a desired surface when the inscribing portion is removed from the stub portion by tearing along the tear line. The stub portions of the note sheets remain intact in the stack through the binding member when the inscribing portions of middle ones of the note sheets are removed from the stack.

BRIEF DESCRIPTION OF THE DRAWINGS

In drawings which illustrate an embodiment of the invention.

DETAILED DESCRIPTION OF THE PREFERRED EMBODIMENT

Figure 1:
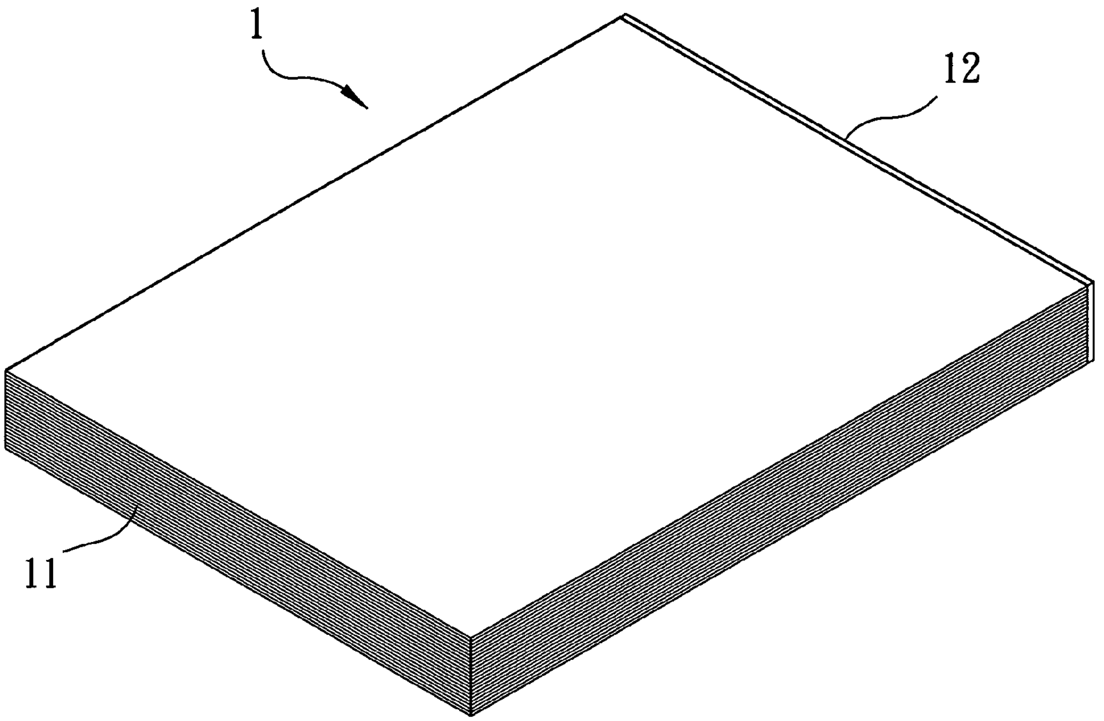
FIG. 1 PRIOR ART
FIG. 1 is a perspective view of a conventional note pad.
Figure 2:
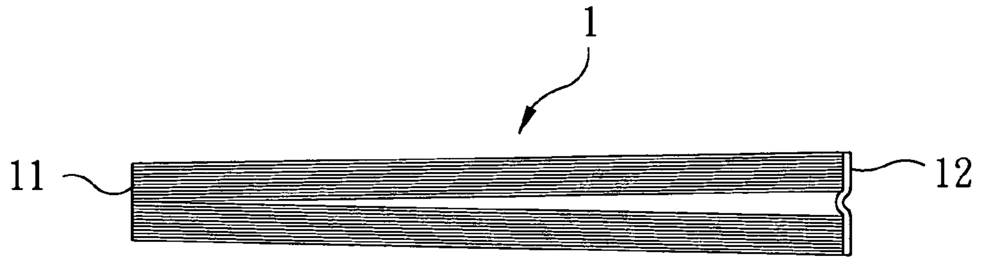
FIG. 2 PRIOR ART
FIG. 2 is a side view to illustrate how an adhesive film is deformed after removal of middle ones of stacked note sheets of the conventional note pad.
Figure 3:
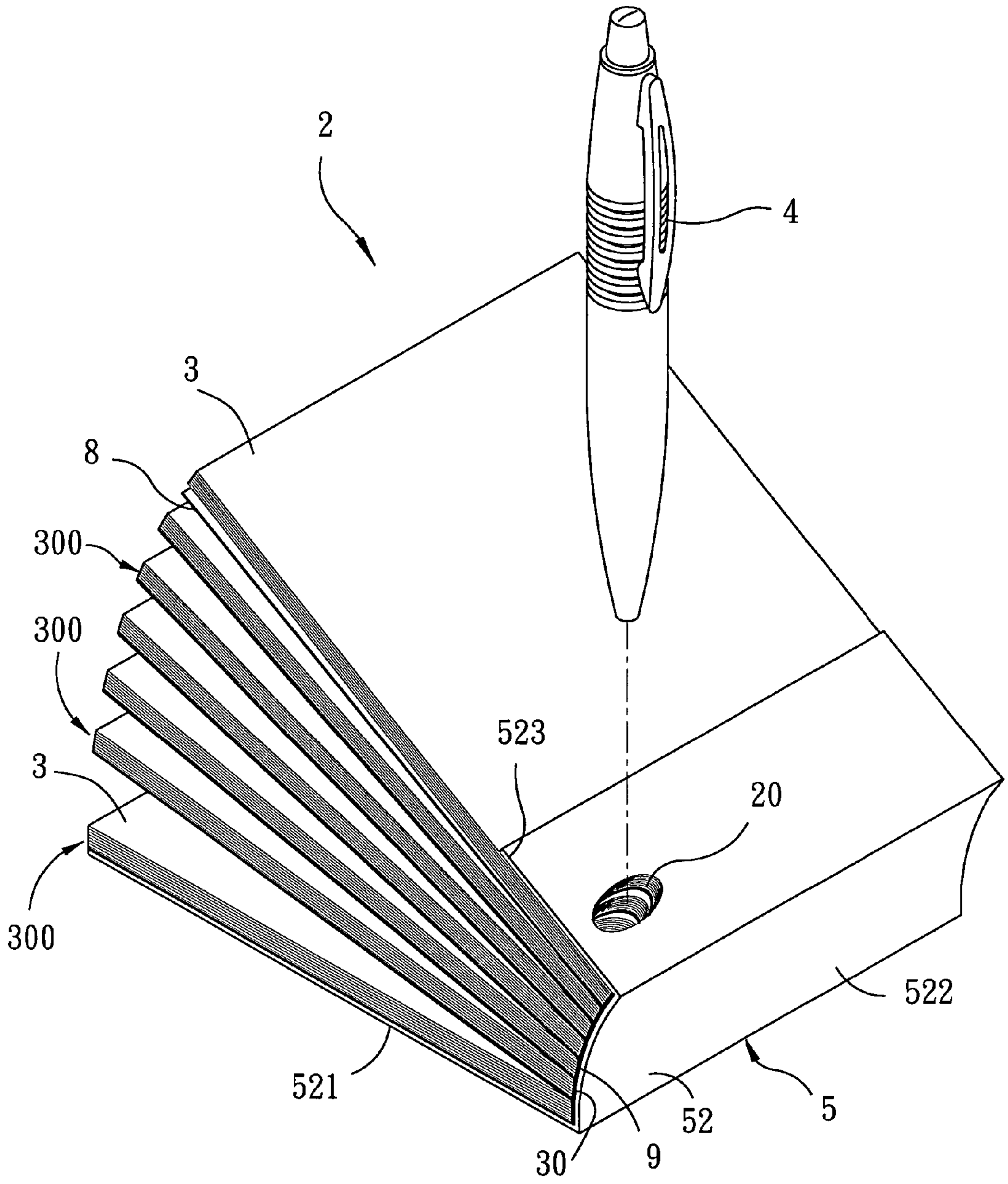
FIG. 3 is a perspective view of the preferred embodiment of a note pad according to this invention.
Figure 4:
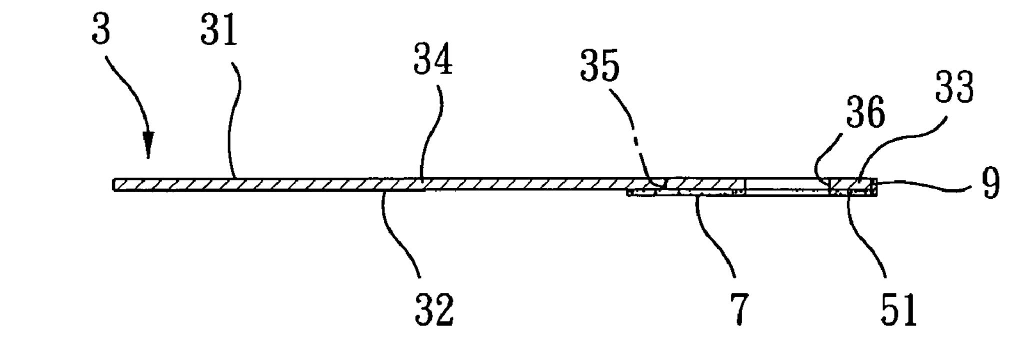
FIG. 4 is a side view of a note sheet of the embodiment.

FIGS. 3 and 4 illustrate a preferred embodiment of a note pad 2 according to this invention. The note pad 2 includes: a plurality of note sheets 3 stacked one above the other, each of the note sheets 3 having top and bottom surfaces 31, 32 and a perforated tear line 35 that is formed on the top surface 31 and that divides the note sheet 3 into a stub portion 33 and an inscribing portion 34 so as to facilitate removal of the inscribing portion 34 from the stub portion 33 after writing on the inscribing portion 34; a binding member 5 that binds the stub portions 33 of the note sheets 3 in a stack; and a repositionable adhesive layer 7 provided on the bottom surface 32 of each of the note sheets 3 at the inscribing portion 34 of each of the note sheets 3 and disposed adjacent to the tear line 35 so as to permit adherence of the inscribing portion 34 to a desired surface when the inscribing portion 34 is removed from the stub portion 33 by tearing along the tear line 35. The stub portions 33 of the note sheets 3 remain intact in the stack through the binding member 5 when the inscribing portions 34 of middle ones of the note sheets 3 are removed from the stack. As a consequence, the remainder of the note pad 2 can remain in a stack and the shape of the binding member 5 remains substantially unchanged even after the inscribing portions 34 of middle ones of the note sheets 3 are removed from the stack, thereby eliminating the aforesaid drawbacks associated with the prior art.

In this embodiment, the binding member 5 includes a stub-binding adhesive layer 51 provided on the bottom surface 32 of each of the note sheets 3 at the stub portion 33 of each of the note sheets 3 so that the stub portions 33 of the note sheets 3 are bound together. Alternatively, the binding member 5 can include a binding adhesive 9 and a panel 52 that has a bottom lateral portion 521 underlying and bonded adhesively to the lowermost one of the note sheets 3 in the stack, a vertical portion 522 covering and bonded adhesively to binding sides 30 of the stub portions 33 of the note sheets 3 (the binding side 30 of each stub portion 33 is disposed at a position opposite to the tear line 35) through the binding adhesive 9, and a top lateral portion 523 overlying and bonded adhesively to the stub portion 33 of the uppermost one of the note sheets 3 in the stack so as to bind the note sheets 3. Preferably, the binding member 5 includes both the stub-binding adhesive layer 51 on the stub portion 33 of each note sheet 3 and the panel 52 coated with the binding adhesive 9.

The repositionable adhesive layer 7 and the stub-binding adhesive layer 51 are preferably made from pressure sensitive adhesive, and are formed by applying the pressure sensitive adhesive from the stub portion 33 through the tear line 35 to an adjacent end of the inscribing portion 34 of each note sheet 3.

Figure 5:
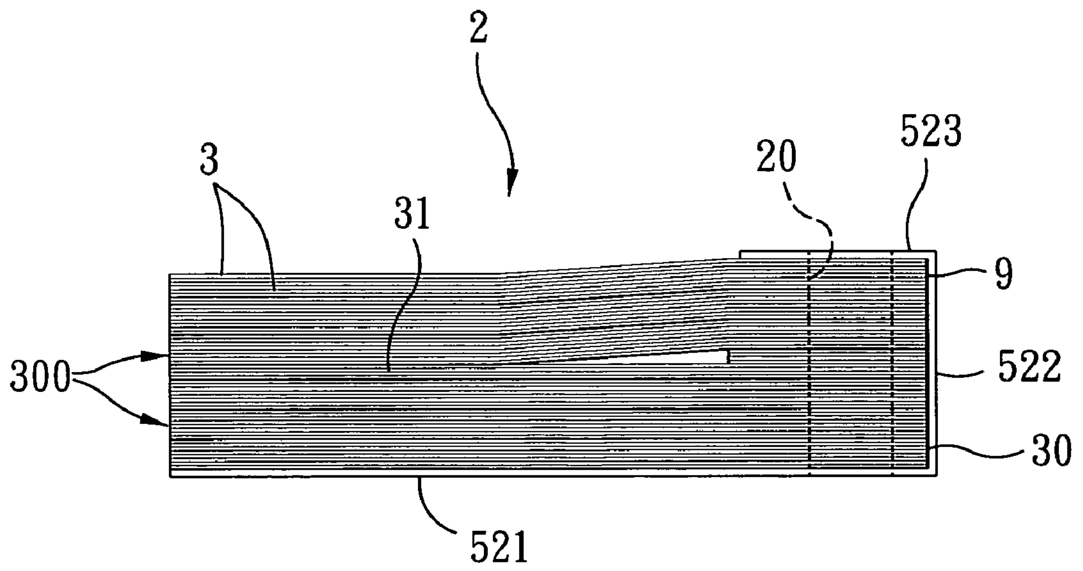
FIG. 5 is a side view to illustrate how the note pad of the preferred embodiment remains intact after removal of middle ones of the note sheets therefrom.

Preferably, the note pad 2 is a multi-color multi-ply note pad such that the note sheets 3 thereof include a plurality of plies 300 (see FIG. 5) which differ from each other in color or pattern formed thereon. Two adjacent ones of the plies 300 are separated by a partition sheet 8, which is adhesively bonded to the binding member 5, so that access to one of the note sheets 3 in a selected one of the plies 300 can be facilitated. As best illustrated in FIG. 5, the note pad 2 remains in a stack after removal of middle ones (see the empty spaces in the note pad 2 shown in FIG. 5) of the note sheets 3.

Preferably, the stub portion 33 of each of the note sheets 3 is formed with a through-hole 36. The through-holes 36 in the stub portions 33 of the note sheets 3 are aligned in a vertical direction so as to define a pen-receiving hole 20 in the note pad 2 for receiving a pen 4 therein (see FIG. 3).

By virtue of the tear line 35, which is formed on each note sheet 3 of the note pad 2 of this invention, an end portion of each note sheet 3, i.e., the stub portion 33 of each note sheet 3, remains in the stack, which is advantageous in binding the remainder of the note sheets 3 in the stack, thereby eliminating the aforesaid drawbacks associated with the prior art.

With the invention thus explained, it is apparent that various modifications and variations can be made without departing from the spirit of the present invention. It is therefore intended that the invention be limited only as recited in the appended claims.

We claim:

1. A note pad in combination with a pen comprising:

a plurality of note sheets stacked one above the other, each of said note sheets having a bottom surface and a perforated tear line that divides said note sheet into a stub portion and an inscribing portion so as to facilitate removal of said inscribing portion from said stub portion;

a binding member that binds said stub portions of said note sheets in a stack; and a repositionable adhesive layer provided on said bottom surface of each of said note sheets at said inscribing portion of each of said note sheets and disposed adjacent to said tear line so as to permit adherence of said inscribing portion to a desired surface when said inscribing portion is removed from said stub portion by tearing along said tear line;

wherein said stub portions of said note sheets remain intact in said stack through said binding member when said inscribing portions of middle ones of said note sheets are removed from said stack;

wherein said stub portion of each of said note sheets has a binding side opposite to said tear line, said binding member including a binding adhesive and a panel that is adhesively bonded to said binding sides of said note sheets through said binding adhesive;

wherein said panel has a bottom lateral portion that underlies at a lowermost one of said note sheets in said stack, a vertical portion that covers said binding sides of said note sheets, and a top lateral portion that overlies on said stub portion of an uppermost one of said note sheets in said stack;

wherein said note pad is formed with a pen-receiving hole that extends through said stub portions of said note sheets and at least said top lateral portion of said panel and a pen is disposed in said hole.

2. The note pad a combination with a pen of claim 1, wherein said binding member includes a stub-binding adhesive layer provided on said stub portion of each of said note sheets.

3. The note pad a combination with a pen of claim 2, wherein said stub-binding adhesive layer is provided on said bottom surface of each of said note sheets.

4. The note pad a combination with a pen of claim 3, wherein said stub-binding adhesive layer is made from pressure sensitive adhesive.

5. The note pad a combination with a pen of claim 1, wherein said note sheets are divided into a plurality of plies, said note pad further comprising a partition sheet that separates two adjacent ones of said plies.

6. The note pad a combination with a pen of claim 1 wherein said pen-receiving hole also extends through said bottom lateral portion.

* * * * *